(12) United States Patent
Wu et al.

(10) Patent No.: US 10,379,771 B1
(45) Date of Patent: *Aug. 13, 2019

(54) SYSTEMS AND METHODS FOR POLICY DRIVEN STORAGE IN A HYPER-CONVERGENCE DATA CENTER

(71) Applicant: VCE IP Holding Company LLC, Richardson, TX (US)

(72) Inventors: Jiatai Wu, San Jose, CA (US); Rama Krishna Gurram, San Jose, CA (US); Krishna Kattumadam, Saratoga, CA (US)

(73) Assignee: VCE IP Holding Company LLC, Richardson, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/133,304

(22) Filed: Sep. 17, 2018

Related U.S. Application Data (63) Continuation of application No. 14/717,797, filed on May 20, 2015, now Pat. No. 10,078,465.

(51) Int. Cl.
*G06F 3/06* (2006.01)

(52) U.S. Cl.
CPC ............ *G06F 3/0635* (2013.01); *G06F 3/067* (2013.01); *G06F 3/0613* (2013.01)

(58) Field of Classification Search
CPC ....... G06F 3/0635; G06F 3/0613; G06F 3/067
USPC .......................................................... 710/74
See application file for complete search history.

(56) References Cited

U.S. PATENT DOCUMENTS

| | | |
|---|---|---|
| 8,032,701 B1 | 10/2011 | Glade et al. |
| 8,239,584 B1 | 8/2012 | Rabe et al. |
| 9,052,823 B2 | 6/2015 | Yamamoto et al. |
| 9,626,211 B2 | 4/2017 | Riewrangboonya et al. |
| 9,665,235 B2 | 5/2017 | Van Der Walt et al. |
| 2001/0052061 A1 | 12/2001 | Fradette |
| 2004/0006604 A1 | 1/2004 | Kawashima et al. |
| 2012/0096473 A1 | 4/2012 | Durham et al. |
| 2012/0180047 A1 | 7/2012 | Cardona et al. |
| 2012/0221765 A1 | 8/2012 | Yoo et al. |
| 2014/0115578 A1 | 4/2014 | Cooper et al. |
| 2014/0129744 A1 | 5/2014 | Muppirala et al. |
| 2015/0188775 A1 | 7/2015 | Van Der Walt et al. |
| 2015/0248402 A1 | 9/2015 | Patterson, III et al. |
| 2016/0026592 A1 | 1/2016 | Ganth et al. |
| 2016/0055579 A1 | 2/2016 | McDonough et al. |

(Continued)

*Primary Examiner* — Christopher B Shin
(74) *Attorney, Agent, or Firm* — Polsinelli PC (57) ABSTRACT

Aspects of the present disclosure involve a system architecture for a policy driven disk IO throughput control for a hyper-converged storage provider. The computing architecture provides a flexible and real-time feature to the IO throughput management of a hyper-converged or converged infrastructure. In particular, through the use of centrally applied policy driven controls, the disk IO throughput allocation of different applications/clients of the converged infrastructure is gauged or otherwise controlled over the network bandwidth that link to the storage pool of the infrastructure. Through the use of the system architecture, the converged infrastructure may not utilize hard-coded disk resource allocation for each application/client in an isolated fashion, thereby allowing the IO throughput management to be flexible and agile in response to executed applications. Further, the IP throughput controlling and storage IP capacity of the converged infrastructure may be maintained separately.

20 Claims, 5 Drawing Sheets

(56) References Cited

U.S. PATENT DOCUMENTS

2016/0087911 A1     3/2016   Diederich et al.
2016/0226971 A1     8/2016   Barajas Gonzalez et al.

SYSTEMS AND METHODS FOR POLICY DRIVEN STORAGE IN A HYPER-CONVERGENCE DATA CENTER

CROSS-REFERENCE TO RELATED APPLICATION

This continuation application is related to and claims priority from U.S. patent application Ser. No. 14/717,797, filed May 20, 2015 entitled "SYSTEMS AND METHODS FOR POLICY DRIVEN STORAGE IN A HYPER-CONVERGENCE DATA CENTER," the entire contents of which is incorporated herein by reference for all purposes

TECHNICAL FIELD

Aspects of the present disclosure relate to configuration of various computing components, among other functions, and more particularly to providing storage policies in a converged infrastructure environment.

BACKGROUND

Widespread adoption of virtualization is rapidly revolutionizing the ways information technology ("IT") departments procure, implement, and operate technology. As such, converged infrastructures provide dynamic pools of computing resources that are intelligently provisioned and managed to address changing demands of customers. For example, a converged infrastructure may include pools of compute, storage, and network devices that may be shared and accessed by multiple applications. Integrating, validating, managing, and optimizing such components is often a drain on IT resources. Accordingly, pre-configured, pre-integrated, and validated infrastructures are highly desirable to customers.

Generally, a typical converged architecture includes a central shared storage attached to the physical servers where flash storage is generally used for high-performance applications and for caching storage from the attached disk-based storage. In a hyper-converged infrastructure, on the other hand, the storage controller function runs as a service on each node in the cluster to improve scalability and resilience. One particular issue with hyper-converged infrastructures includes an efficient way to manage storage input/output (IO) throughput and network usage for situations like contention when multiple IO intensive clients/applications run for the same IO resources. For example, critical application/clients may be unable to acquire adequate disk IO throughput and network bandwidth due to non-critical applications/clients utilizing the same resources of the infrastructure. Generally, there are no effective mechanisms for a controllable disk IO throughput allocation over the sharing applications/clients in one single hyper-converged infrastructure environment.

SUMMARY

Implementations of the present disclosure include a method for managing a hyper-converged infrastructure system. The method includes the operations of receiving a request for an adjusted input/output (IO) throughput associated with one of a plurality of clients of a hyper-converged infrastructure system, converting the request for the adjusted IO throughput into an adjusted IO throughput network policy for the plurality of clients of the hyper-converged infrastructure system, translating the adjusted IO throughput network policy for the plurality of clients of the hyper-converged infrastructure system into an input for a IO throughput controller, and adjusting the IO throughput from a shared pool of storage devices to the one of the plurality of clients of the hyper-converged infrastructure system based at least on the received request.

Another implementation of the present disclosure includes a hyper-converged infrastructure system. The system includes a plurality of clients in communication with at least one component of the hyper-converged infrastructure system, each of the plurality of clients comprising one or more computing devices configured to execute one or more applications utilizing the at least one component of the hyper-converged infrastructure system, a pool of storage devices in communication with the plurality of clients, the pool of storage devices available to each of the plurality of clients, and an input/output (IO) throughput controller logically located between the plurality of clients and the pool of storage devices. The IO throughput controller is configured to control the access throughput for the pool of storage device to each of the plurality of clients through the operations of receiving a request for an adjusted IO throughput associated with one of the plurality of clients, converting the request for the adjusted IO throughput into an adjusted IO throughput network policy for the plurality of clients, and adjusting the IO throughput for the shared pool of storage devices to the one of the plurality of clients based at least on the received request.

DETAILED DESCRIPTION

Aspects of the present disclosure involve a system architecture for a policy driven disk IO throughput control for a hyper-converged storage provider. The architecture provides a flexible and real-time feature to the IO throughput management of a hyper-converged or converged infrastructure. In particular, through the use of centrally applied policy driven controls, the maximum disk IO throughput allocation of different applications/clients of the converged infrastructure is gauged or otherwise controlled over the network bandwidth that link to the storage pool of the infrastructure. Through the use of the system architecture, the converged infrastructure may not utilize hard-coded disk resource allocation for each application/client in an isolated fashion, thereby allowing the IO throughput management to be flexible and agile in response to executed applications. Further, the IP throughput controlling and storage IO capacity of the converged infrastructure may be maintained separately.

In one particular embodiment of the system architecture for a policy driven disk IO throughput controller for storage in a converged infrastructure storage, a software program may execute the policy for any number of clients/applications accessing a commonly shared batch of storage devices. The policy may accept as inputs several aspects of the converged architecture system. In one example, the policy accepts a request for a particular IO throughput from an executing or about to be executed application. In response, the IO throughput controller may adjust IO throughput to the particular client/application that made the request. In addition, the policy may also consider global rules for IO throughput set by a converged architecture administrator, past and current performance metrics for the converged architecture system, one or more service agreements between the client and the converged architecture system administrator(s), and day and time of the request for IO throughput before allocating such throughput to a requesting application. In general, the system applying the throughput policy may consider any aspect of the converged architecture system when determining the IO throughput to provide to the client/application. Once the available IO throughput to be provided to the requesting application/client is determined, the system may allocate such throughput through one or more calls or commands to the converged architecture system.

The various systems and methods disclosed herein provide for configuring one or more components of a converged infrastructure. It will be appreciated that, although some of the example implementations described herein involve the IO throughput policy being applied to a converged infrastructure or a hyper-converged infrastructure, the system and methods described herein may apply to any type of computing system or computing network where bandwidth to a shared storage system may be controlled to increase the efficiency of the bandwidth used by the computing system.

Figure 1:
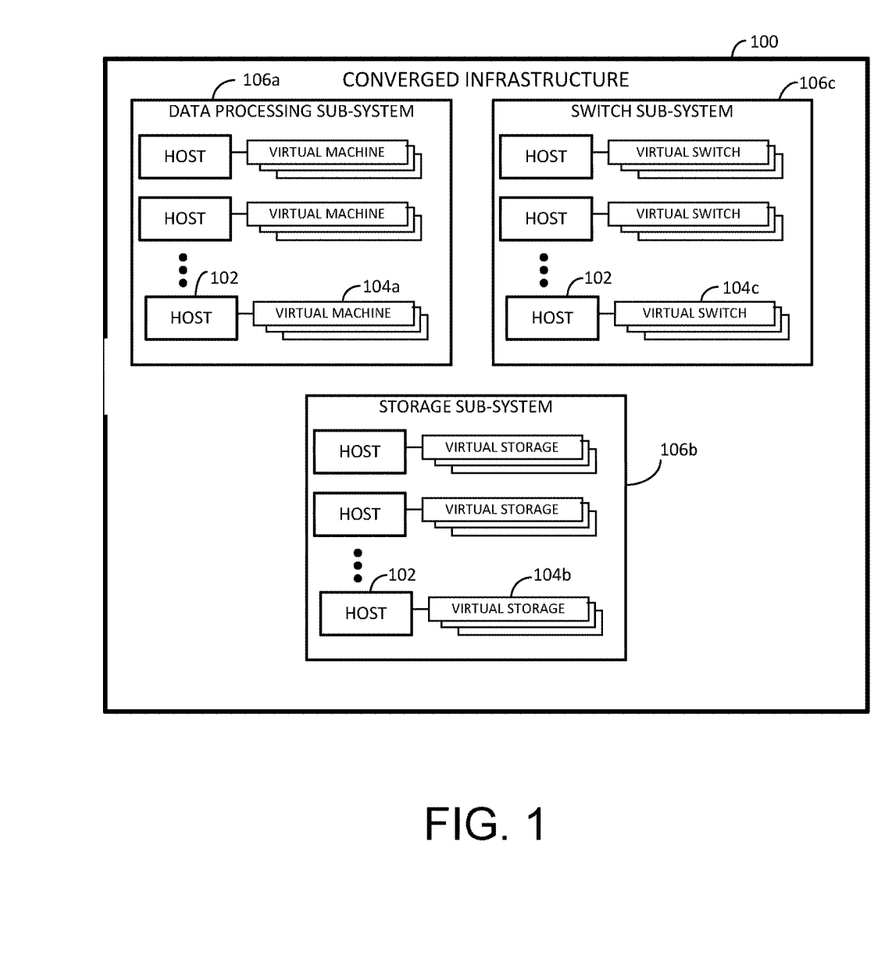
FIG. 1 illustrates an example converged infrastructure that may be implemented as a computing node of a distributed computing environment according to one embodiment of the present disclosure.

As mentioned above, the system architecture for a policy driven disk IO throughput control may be utilized in a type of converged computing infrastructure and, in particular, a hyper-converged infrastructure. Thus, FIG. 1 illustrates an example converged infrastructure 100 that may utilize the IO throughput control system described herein. In one embodiment, multiple converged infrastructures 100 as described herein may be configured to communicate with one another using a communication network to form at least a portion of a distributed computing environment.

The converged infrastructure 100 may be any type having multiple hosts 102 that each executes one or more virtual objects (e.g., virtual machines 104a, virtual storage objects 104b, and virtual switch objects 104c). The hosts of a converged infrastructure are often referred to as compute servers. Nevertheless, in this disclosure, the term 'host' may be interpreted as any physical device and/or component that supports the operation of virtual resources and services provided by those virtual resources. The particular converged infrastructure 100 as shown includes several sub-systems, such as a data processing sub-system 106a, a data storage sub-system 106b, and a switch sub-system 106c. Nevertheless, it should be understood that converged infrastructures may include additional, fewer, or different types of sub-systems without departing from the spirit and scope of the present disclosure.

In one aspect, the converged infrastructure 100 includes a combination of these sub-systems or other sub-systems that are packaged and interconnected in a standardized manner for ease of maintenance and use. Converged infrastructures such as these are often implemented in environments where relatively high reliability and/or availability are desired, such as in an enterprise environment. Nevertheless, it is contemplated that any sub-system of the converged infrastructure, such as a computer cluster, computing grid, blade array, and/or other converged infrastructure may be managed using the teachings of the present disclosure. For example, a converged infrastructure 100 such as that shown includes components found in VBLOCK™ System infrastructure packages available from VCE, LLC, which is located in Richardson, Tex.

In one embodiment of the converged infrastructure, the data storage sub-system 106b includes computer-readable memory structures for storing data used by the converged infrastructure 100, which may include network attached storage (NAS) arrays and/or storage area network (SAN) arrays that are facilitated by multiple virtual objects (e.g., virtual storage objects 204b). The switch sub-system 106c provides for communication among the various sub-systems of the converged infrastructure 100, and may include components, such as fabric interconnect systems, Ethernet switches/routers, and the like. The data processing sub-system 106a executes applications that access, store, and otherwise manipulate data stored by the converged infrastructure 100. For a particular example, either of the data storage sub-system 106b, the switch sub-system 106c, and/or the data processing sub-system 106a may comprise a blade computing platform having multiple hosts (e.g., blade computing devices) that each executes one or more virtual objects.

Each sub-system may include multiple hosts 102 that each executes one or more virtual objects, which in this particular example, are virtual machines (VMs) 104a, virtual storage objects 104b, and virtual switch objects 104c. For example, virtual objects, such as the VMs 104a may include software-based operating systems that are emulated on their respective hosts, which are physical computing devices. For each host, its respective VMs may be managed by a hypervisor that provides a virtual architecture for each VM's operation and controls various aspects of their operation. One example of a suitable hypervisor includes the VMWARE ESX™ software suite that is available from VMware corporation, which is located in Palo Alto, Calif.

As described above, the data storage sub-system 106b of some converged infrastructures 100 is attached directly to the physical servers of the infrastructure such that flash storage may be used for high-performance applications. In a hyper-converged infrastructure design, however, the storage controller function runs as a service on each node of the infrastructure 100 in the cluster to improve scalability and resilience. For example, FIG. 2 illustrates an example hyper-converged infrastructure system 200 where several nodes or clients of the infrastructure utilize the same bank of storage servers 202 and storage devices 204.

Figure 2:
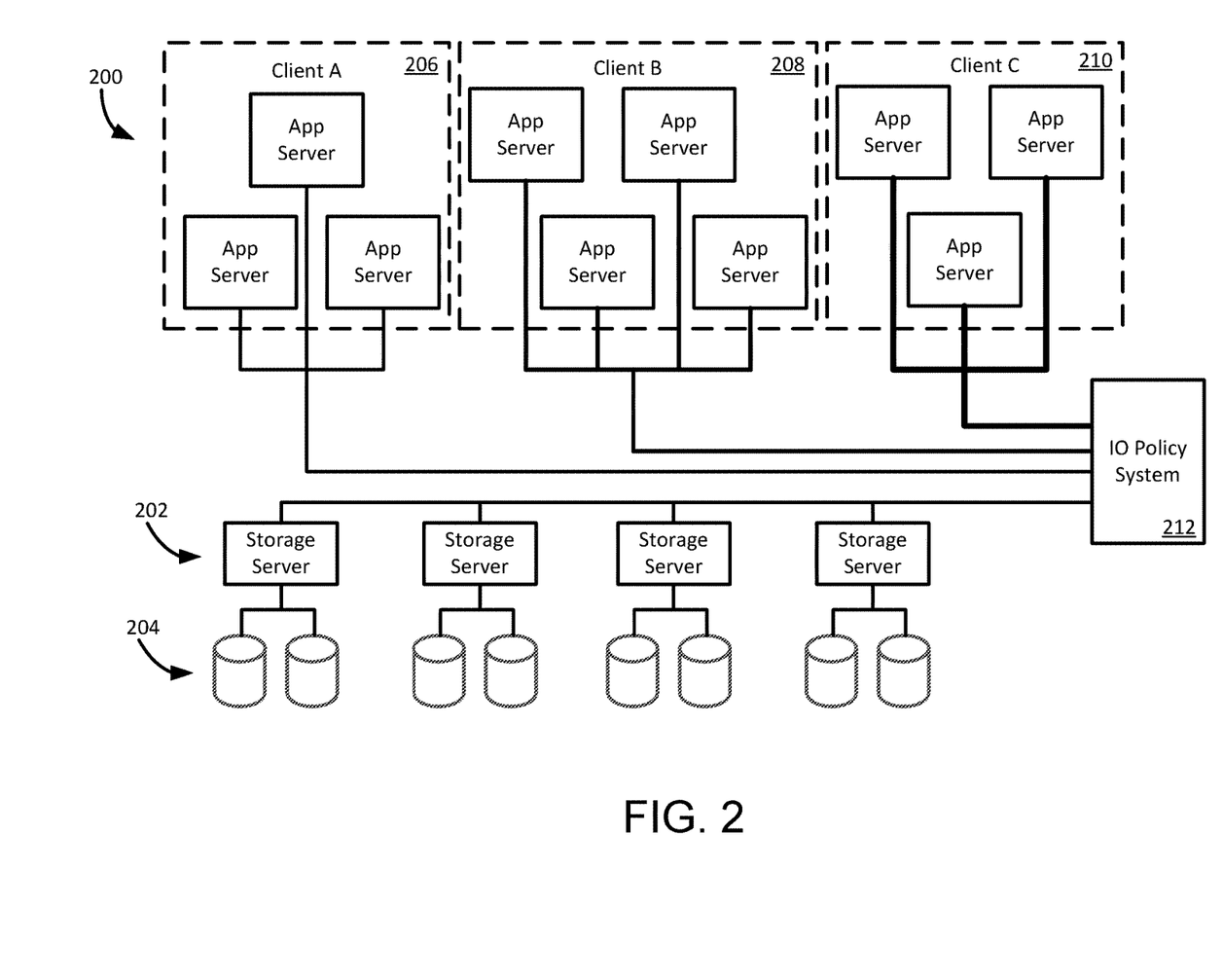
FIG. 2 illustrates an example converged infrastructure system for applying an IO throughput policy to the system.

In the hyper-converged infrastructure 200 of FIG. 2, one or more clients 206-210 may run or executing any number of applications, similar to the sub-systems described above. However, rather than having the physical servers hosting the virtual machines of the infrastructure be directly connected to storage devices, the storage sub-system 106b in the hyper-converged infrastructure is replaced with a software service at each virtual machine of the infrastructure. In this configuration, the local storage 204 across the cluster of nodes of the infrastructure may be combined into a single storage pool available to each node or client 206-210 of the system 200. Thus, each storage server 202 of the infrastructure 200 is available to each node or client 206-210 as a single, scalable pool of available storage device 204. In general, data that is to be kept local for a fast response may be stored locally, while data that is used less frequently may be stored on one of the servers that might have spare capacity. Further, because the storage controller is a software service, there is no need for the SAN or NAS hardware in the hyper-converged infrastructure.

As should be appreciated, the converged infrastructure 200 administrator may desire an efficient way to manage storage IO throughput and network usage between the clients 206-210 of the infrastructure and the storage servers 202. For example, a situation may arise where multiple IO intensive clients/applications are executed utilizing the same pool of available storage 204, such as when a critical application is executing that requires a high IO throughput with the storage pool, resulting in resource contention within the system. Without some type of IO throughput management by the infrastructure 200, the critical application may utilize too much of the available IO throughput such that the other executing applications must fight for bandwidth to the storage pool. Alternatively, the critical application may not receive enough IO throughput to the storage pool such that execution of the application is compromised. In either situation, the infrastructure 200 is not operating efficiently in regards to usage of the storage pool and the IO throughput or bandwidth provided to each executing application in the infrastructure 200.

Previous converged infrastructures utilized a physical disk allocation of the storage devices during an initial sizing of the application. However, such disk usage quotas are fixed once established for each application/client and are usually unchangeable while the application is running online. In an alternative embodiment, the converged infrastructure 200 illustrated in FIG. 2 includes system architecture for a policy driven disk IO throughput controller 212. This policy-driven IO throughput controller 212 provides the infrastructure 200 provides a flexible controller of the IO throughput that may be altered in real-time in response to conditions of the infrastructure. In general, the disk IO throughput allocation to the different applications/clients 206-210 of the infrastructure 200 is centrally gauged via policy-driven controls over the network bandwidth linked to the storage pool 204. This policy-driven controller 212 removes the need to hard-code disk allocation for each application in an isolated fashion and allows for the infrastructure IO throughput controlling and storage IO capacity to be separately maintained.

In FIG. 2, a higher IO throughput or higher bandwidth to a client 206-210 is illustrated in a darker and thicker line connecting the client to the IO policy system 212. Thus, as shown in FIG. 2, client C 210 of the infrastructure 200 has a higher IO throughput or bandwidth than client A 206. As explained in more detail below, a higher IO throughput may be provided to a client 206-210 by the IO throughput controller 212 for any reason, such as an agreement between the client and the infrastructure administrator, the importance of one or more applications being executed by the client's network, the overall available bandwidth to the storage pool 204, and the like. Further, because the IO throughput control is policy-based, the bandwidth provided to the clients 206-210 may be controlled in real-time and may react to one or more operating conditions of the infrastructure 200 to provide flexibility to the infrastructure on IO throughput to the storage pool 204.

Figure 3:
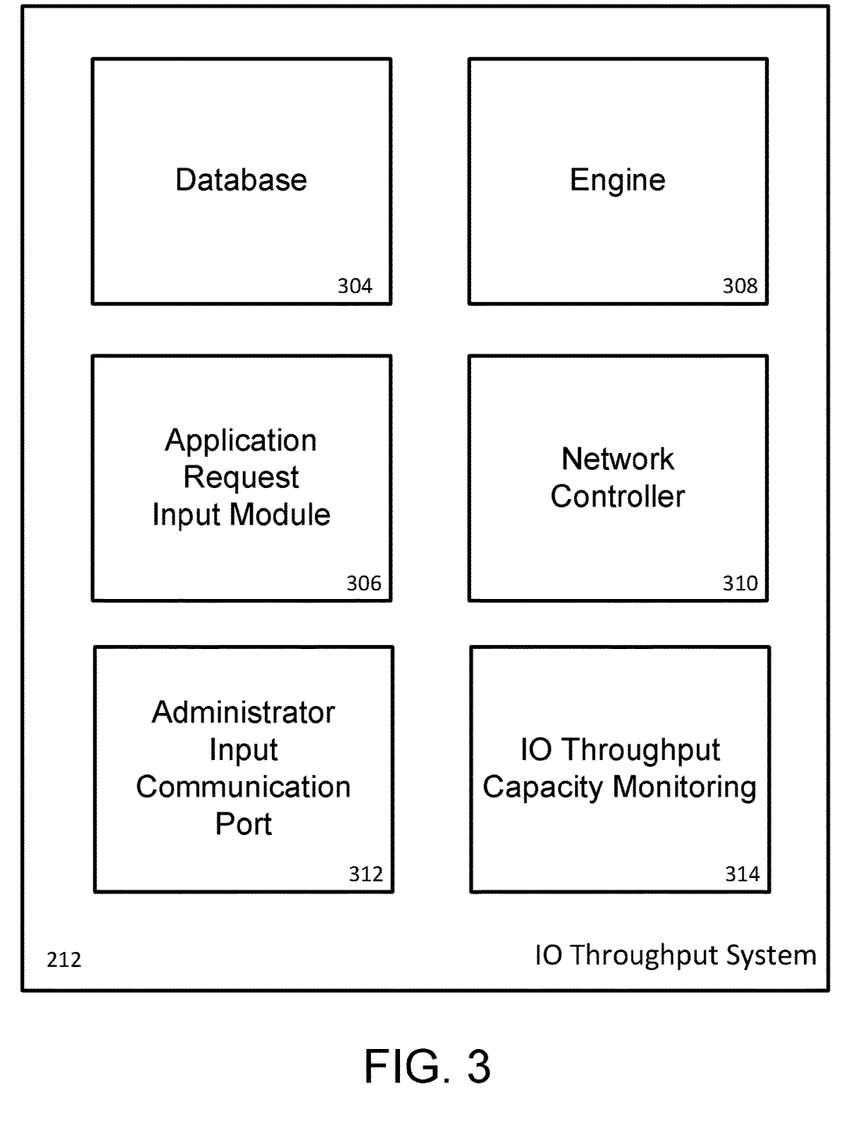
FIG. 3 is a block diagram of a system for applying an IO throughput policy to a converged infrastructure system.

FIG. 3 is a block diagram illustrating an exemplary system for applying an IO throughput policy to a converged infrastructure system. In general, the IO throughput system 212 of FIG. 3 includes several components, including (but not limited to), a policy database 304, a system engine 308, a network controller 310, a input for receiving requests 306 from applications executing on or to be executed by the infrastructure, an administrative input communication port 312, and an IO throughput capacity monitoring module 214. Additional or fewer components may be included in the IO throughput system 212. Further, the components of the IO throughput system 212 may be included in a single device within the infrastructure or may be included in any number of components of the infrastructure. In particular, the components of the IO throughput system 212 may include instructions executed by a computing device. As such, the instructions may be stored on and/or executed by any number of computing components of the infrastructure. The operations of each of the components of the IO throughput system 212 may be performed through a series of software instructions, hardware components or a combination of both software and hardware. The general operations of each component of the IO throughput system 212 are described in more detail below.

Initially, the IO throughput system 212 includes a policy engine module 308 that performs the operations of the system. For example, the policy engine module 308 may interpret received information and determine a network policy to apply to the infrastructure 200 based on that received information. Such information may be stored and/or retrieved from a policy database 304 associated with the IO throughput system. In addition, network policies may be applied to the infrastructure through the network controller 310. In one embodiment, the policy engine module 308 determines the IO throughput policy to be applied to the infrastructure 200 and instructs the network controller 310 to execute the determined policy. Thus, the network controller 310 may be configured to generate and/or transmit IO throughput configuration instructions to the one or more storage servers 202, the storage devices 204, and/or the network clients 206-210 of the infrastructure to control the IO throughput to the clients.

As mentioned above, the engine component 308 may utilize certain information when generating the IO throughput policy for the infrastructure 200. Such information may be provided to the IO throughput system 212 or generated by the system. For example, the IO throughput system 212 may include an application request input module that receives a request for IO throughput by an application or client of the infrastructure. Such requests may include some indication of the desired IO throughput for an executing application or an application that is to be executed on the infrastructure. For example, an application to be executed by the infrastructure may be deemed critical or otherwise important to the infrastructure. Such an application may request IO throughput from the IO throughput controller system 212 for execution of the application. Further, such a request may be received by the application/client at any time during the execution of the application. Thus, the application/client may request more or less IO throughput bandwidth depending on the execution stage of the application. As discussed below, such information may result in a change to the IO throughput policy applied to the infrastructure to account for the request.

In another example, the IO throughput system 212 may include a communication port 312 through which an infrastructure administrator may provide information to the system. Such information may include service agreements between the administrator and one or more of the clients 206-210 of the infrastructure 200, executive decisions on requests for IO throughput from applications, general policy and default priority rules for clients of the infrastructure, and the like. In general, any information that the IO throughput system 212 may utilize to determine the IO throughput policy for the infrastructure 200 may be received from an administrator of the environment through the communication port 312. In addition, such information may be stored in the policy database 304 for use by the engine 308 during adjustments or initialization of the IO throughput policy of the infrastructure 200.

In addition, the IO throughput system 212 may include an IO throughput capacity monitoring module 314 that performs periodic or continual monitoring of the IO throughput policy applied to the infrastructure 200. For example, the IO throughput capacity monitoring module 314 may note the IO throughput provided to each client/application 206-210 of the infrastructure 200 and store such information in the policy database 304. Additional information, such as the date and time of the monitoring, may also be stored. In one example, the monitoring may occur over a period of time determined by an infrastructure administrator or the IO throughput system engine 308. In another example, the monitoring may occur in snapshots taken of the IO throughput capacity applied to the infrastructure. The monitoring information may be utilized by the engine 308 of the IO throughput system 212 to adjust or when determining the IO throughput policy applied to the infrastructure. For example, the IO throughput capacity monitoring module 314 may detect a slowdown or change in the available IO throughput of the infrastructure 200. This may occur when one of the storage servers 204 experiences an operational problem. This slowdown or change may be then stored in the policy database 304, or sent directly to the policy engine module 308 as an alert in a change in the available IO throughput. The engine 308, in response, may adjust the IO throughput policy of the infrastructure accordingly. In another example, the policy engine module 308 may analyze the IO throughput capacity history when determining an efficient IO throughput policy. Such uses of the IO throughput capacity monitoring 314 module are discussed in more detail below with reference to FIG. 4.

Figure 4:
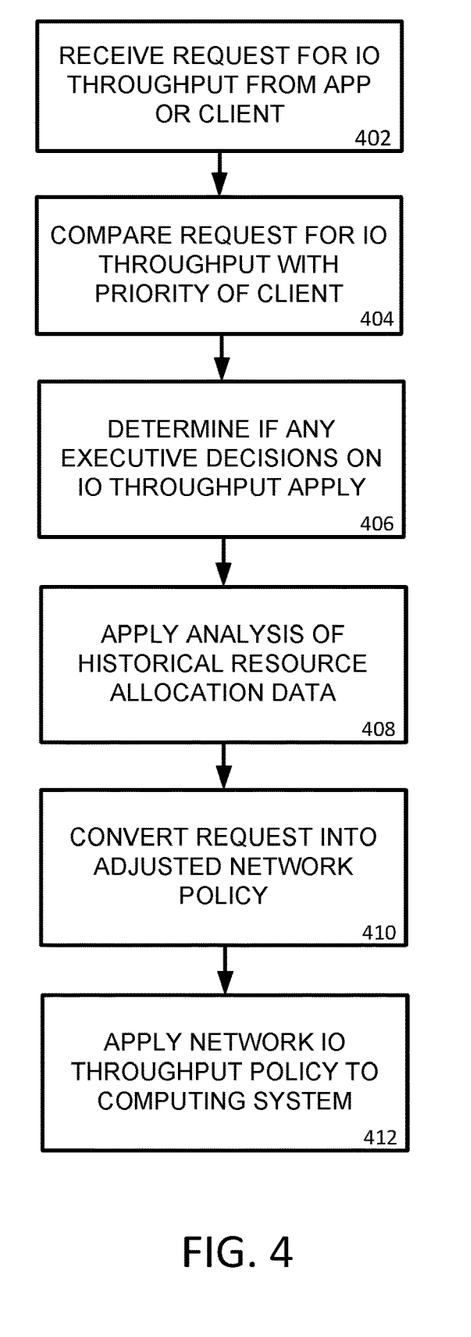
FIG. 4 is a flowchart of a method for updating an IO throughput policy in a converged infrastructure system.

As mentioned, the IO throughput policy for the infrastructure 200 may be provided to the IO throughput system or controller 212 by an administrator of the infrastructure. Such a policy may be based on one or more service agreements between the clients 206-210 of the infrastructure and the administrator. Alternatively or in addition, the policy provided by the administrator may be based on the particular applications to be executed on the infrastructure. However, utilizing such a policy from information provided by an administrator is not adjustable in real-time to be flexible to the changing operational conditions of the infrastructure. Thus, FIG. 4 is a flowchart of a method for updating an IO throughput policy in a converged infrastructure system in real-time. The method of FIG. 4 may thus provide a responsive IO throughput policy for the infrastructure that is not set at the storage devices 204 when applications of the infrastructure are initialized.

The operations of the method of FIG. 4 may be performed by the IO throughput system 212 described above, and in particular one or more of the modules or components of the system. In one example, the policy engine component 308 may perform the operations of the method while utilizing one or more of the other components, such as the policy database 304. Further, the engine component 308 may execute a set of instructions to perform the method, may utilize one or more hardware components to perform the operations, or utilize a combination of software and hardware to perform the operations. In general, any component of the IO throughput system 212 may perform the operations described herein.

Beginning in operation 402, the IO throughput system may receive a request for IO throughput from an application or client of the infrastructure. The request may include some indication of a resource request for the execution of the application. In one example, the resource request is a lower limit of IO throughput or bandwidth for executing the application. Further, the request may be received through an application programming interface (API) associated with the infrastructure for receiving resource requests from clients or applications and providing the request to the IO throughput system.

It should be appreciated that one or more of the operations of the method of FIG. 4 may be removed from the method and/or not performed by the IO throughput system. For example, some infrastructures may not provide a mechanism through which an application or client requests resources of the infrastructure. In such configurations, the operation of receiving the request at the IO throughput system is not performed. In a similar manner, other operations may also be omitted or otherwise not performed by the IO throughput system.

Once the request for an infrastructure resource is received, the IO throughput system may compare the request to a predefined service level agreement for the application and/or client from which the request was received in operation 404. For example, as mentioned above, a client to the infrastructure may enter into a service agreement with an administrator of the converged infrastructure. Such an agreement may include a maximum or minimum IO throughput available to the client. Further, the agreement may determine certain applications executed in the client environment or network that receive the maximum or minimum IO throughput. The agreement may include other factors that affect the available IO throughput for an application or the client, such as time/day factor that establishes the available IO throughput based on a date/time that the request is received, the priority of the client/application in relation to other clients/applications associated with the infrastructure, and the security of the client's network, among others. In general, any factor of the client/application and the infrastructure may be included in the service level agreement between the parties that determines the available IO throughput for execution of an application.

In operation 406, the IO throughput system may consider any executive decisions on the application/client priority received from an administrator of the infrastructure. For example, in some instances, the administrator of the converged infrastructure may override the priority determination for an application/client due to circumstances not otherwise considered by the IO throughput system. One such circumstance occurs when the application to be executed is crucial to the operation of the client's network or the infrastructure. Such applications may obtained priority for additional IO throughput through a command or commands provided to the IO throughput system by the system administrator. In another embodiment, such commands from the administrator may be considered by the IO throughput system, but not necessarily implemented when weighed along with the other considerations for IO throughput control.

As described above, the IO throughput system may consider historical data concerning the IO throughput of the converged infrastructure when determining the IO throughput policy. Thus, in operation 408, the IO throughput system may apply an analysis of historical resource allocating data from the database of the system. For example, the IO throughput system may consider the current state of the IO throughput policy applied to the infrastructure prior to adjusting the policy. This information may be stored in the policy database 304 by the IO throughput capacity monitoring 314 module of the IO throughput system at a previous time. In one particular embodiment, the information stored in the policy database 304 may be the IO throughput usage over a period of time. With this information, the IO throughput system may determine an adjustment to the IO throughput policy for the infrastructure. For example, the IO throughput system may determine that the requested IO throughput by the application is not available based on the IO throughput of the infrastructure. In another example, the IO throughput system may determine that the requested IO throughput by the application may not be provided due to the other clients of the infrastructure also utilizing IO throughput to the storage pool.

Further still, the IO throughput capacity monitoring of the converged infrastructure may be utilized by the IO throughput system to try and maximize the efficiency of the IO throughput use in the infrastructure. Such efficiency adjustments may be based, in one embodiment, on an historic analysis of efficient resource allocation of the infrastructure stored in the database. Regardless of the information utilized, the IO throughput system may adjust the IO throughput use policy in response to the capacity monitoring discussed above.

In operation 410, the IO throughput system converts the request and/or the executive decisions and/or the analysis of historical resource allocation data to determine an IO throughput policy for the converged infrastructure. In general, the IO throughput policy determines the IO throughput for the clients/applications of the converged infrastructure. In this manner, the IO throughput for the clients/applications of the infrastructure may be tailored to the needs and/or agreements of the clients. Also, the IO throughput policy may be adjusted in real-time in response to any of the inputs or information discussed above.

In operation 412, the IO throughput system applies the determined IO throughput policy to the converged infrastructure system. In one embodiment, the IO throughput system transmits one or more calls or commands to a network controller of the converged infrastructure to activate the new network policy and bandwidth settings. Such calls may be made to a API for execution by the network controller. Through the execution of the commands, the IO throughput policy for the clients/applications of the converged infrastructure may be adjusted or set.

Through the operations and systems described above, an IO throughput policy for a converged infrastructure is determined and employed utilizing an IO throughput system. Application of the IO throughput policy may occur for any reason in response to an operating condition of the converged infrastructure. For example, the IO throughput system may be used to alter a IO throughput policy of a converged infrastructure for variations in workloads based on a time dependent resource allocations. In one particular example, IO throughput intensive applications may be executed during the night when IO throughput for all of the clients of the infrastructure is lower. These applications may then be provided with more IO throughput when the application is scheduled to be executed. Such information about the time and type of application may be stored in the database or provided by an infrastructure administrator and accessed to update the IO throughput policy of the infrastructure. In another day/time example, certain applications may be executed at the end of the business quarter such that the IO throughput policy is adjusted accordingly. In general, the IO throughput policy may be adjusted by the IO throughput system for any time/day consideration.

In another example, the IO throughput system may be used to alter an IO throughput policy of a converged infrastructure for special events related to one or more of the clients of the converged infrastructure. One such event includes a business merger of one or more clients of the infrastructure that may include the execution of one or more applications to incorporate information from a business to the client's network. Thus, the IO throughput policy may be adjusted to provide additional IO throughput to the client network affected by the merger. Similar events include new installations and new applications added to a client's network. In general, any special event related to one or more of the clients of the converged infrastructure may trigger a change in the IO throughput policy for the converged infrastructure.

As described above, the IO throughput system may smartly adjust the IO throughput policy of the converged infrastructure based on the historical IO throughput usage of applications of the infrastructure. In such circumstances, the IO throughput system may predict and/or pre-allocate resources such as IO throughput based on the historical usage of the IO throughput by the clients. For example, the IO throughput system may determine that a particular client of the converged infrastructure executes applications at a particular time or day. Based on such information (typically obtained from the database of the IO throughput system), the IO throughput system may adjust the IO throughput policy to provide that particular client more IO throughput at the noted time or day. In this manner, the IO throughput policy for the converged infrastructure may automatically update or adapt the IO throughput policy for the converged infrastructure in response to system behaviors.

Figure 5:
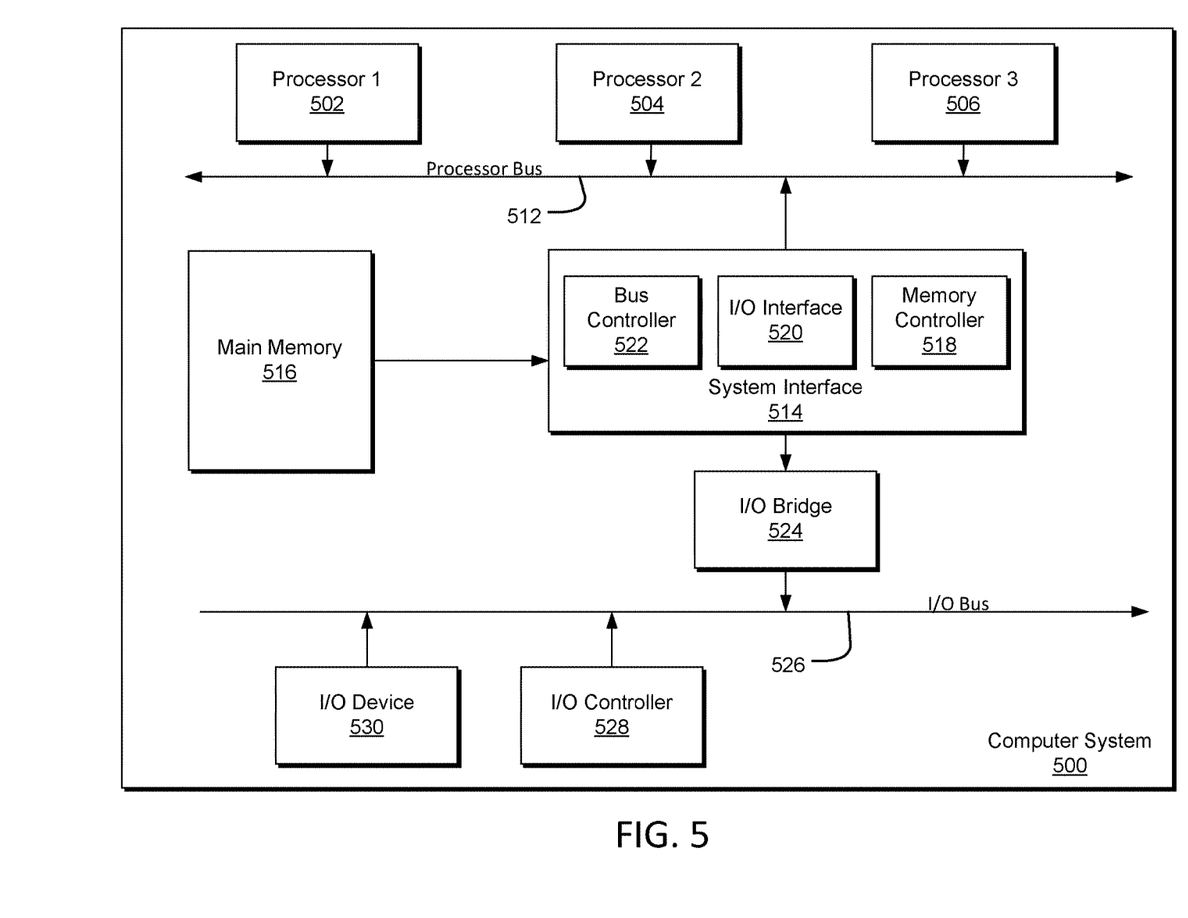
FIG. 5 shows an example computing system that may implement various systems and methods discussed herein, according to one implementation.

FIG. 5 is a block diagram illustrating an example of a computing device or computer system 500 which may be used in implementing the embodiments of the components of the network disclosed above. For example, the computing system 500 of FIG. 5 may be used to implement the various components of the IO throughput system 212 discussed above. The computer system (system) includes one or more processors 502-506. Processors 502-506 may include one or more internal levels of cache (not shown) and a bus controller or bus interface unit to direct interaction with the processor bus 512. Processor bus 512, also known as the host bus or the front side bus, may be used to couple the processors 502-506 with the system interface 514. System interface 514 may be connected to the processor bus 512 to interface other components of the system 500 with the processor bus 512. For example, system interface 514 may include a memory controller 514 for interfacing a main memory 516 with the processor bus 512. The main memory 516 typically includes one or more memory cards and a control circuit (not shown). System interface 514 may also include an input/output (I/O) interface 520 to interface one or more I/O bridges or I/O devices with the processor bus 512. One or more I/O controllers and/or I/O devices may be connected with the I/O bus 526, such as I/O controller 528 and I/O device 540, as illustrated.

I/O device 540 may also include an input device (not shown), such as an alphanumeric input device, including alphanumeric and other keys for communicating information and/or command selections to the processors 502-506. Another type of user input device includes cursor control, such as a mouse, a trackball, or cursor direction keys for communicating direction information and command selections to the processors 502-506 and for controlling cursor movement on the display device.

System 500 may include a dynamic storage device, referred to as main memory 516, or a random access memory (RAM) or other computer-readable devices coupled to the processor bus 512 for storing information and instructions to be executed by the processors 502-506. Main memory 516 also may be used for storing temporary variables or other intermediate information during execution of instructions by the processors 502-506. System 500 may include a read only memory (ROM) and/or other static storage device coupled to the processor bus 512 for storing static information and instructions for the processors 502-506. The system set forth in FIG. 5 is but one possible example of a computer system that may employ or be configured in accordance with aspects of the present disclosure.

According to one embodiment, the above techniques may be performed by computer system 500 in response to processor 504 executing one or more sequences of one or more instructions contained in main memory 516. These instructions may be read into main memory 516 from another machine-readable medium, such as a storage device. Execution of the sequences of instructions contained in main memory 516 may cause processors 502-506 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 516. Common forms of machine-readable medium may include, but is not limited to, magnetic storage medium; optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a computer-readable storage medium having stored thereon instructions, which may be used to program a computer system (or other electronic devices) to perform a process according to the present disclosure. A computer-readable storage medium includes any mechanism for storing information in a form (e.g., software, processing application) readable by a computer, as described above with reference to FIG. 5.

The description above includes example systems, methods, techniques, instruction sequences, and/or computer program products that embody techniques of the present disclosure. However, it is understood that the described disclosure may be practiced without these specific details.

While the present disclosure has been described with reference to various implementations, it will be understood that these implementations are illustrative and that the scope of the disclosure is not limited to them. Many variations, modifications, additions, and improvements are possible. More generally, implementations in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A method comprising:
   determining, based on monitoring a capacity of input/output (IO) throughput of a plurality of client devices of a computer system, to adjust the IO throughput of an associated client device, wherein the associated client device shares access to a shared pool of storage devices with the plurality of client devices of the computer system;
   determining an adjusted IO throughput network policy for the associated client device based on the determination to adjust the IO throughput, wherein the adjusted IO throughput network policy modifies control, in accordance with the monitoring, of IO throughput over a network bandwidth of the associated client device that shares access with the plurality of client devices to the shared pool of storage devices;
   translating the adjusted IO throughput network policy for the associated client device into an input for an IO throughput controller; and
   adjusting, by the IO throughput controller, the IO throughput from the shared pool of storage devices to the associated client device based at least on the adjusted IO throughput network policy.

2. The method of claim 1, wherein the adjusted IO throughput network policy is automatically adjusted in response to a behavior of the associated client device of the computer system, and wherein the computer system is a converged infrastructure.

3. The method of claim 1, wherein the determination to adjust the IO throughput is based on a historical IO throughput usage of the associated client device of the computer system.

4. The method of claim 1, the method further comprising:
   predicting IO throughput based on a historical IO throughput usage of the associated client device; and
   pre-allocating IO throughput in accordance with the prediction to determine the adjusted IO throughput network policy.

5. The method of claim 1 further comprising:
   accessing a policy database to obtain a historical IO throughput usage information file for the associated client device of the computer system; and
   wherein the adjusted IO throughput from the shared pool of storage devices to the associated client device of the computer system is further adjusted based on the historical IO throughput usage information file for the associated client device.

6. The method of claim 1 further comprising:
accessing a listing of priority rankings of the associated client device with respect to other devices of the computer system; and
wherein the adjusted IO throughput from the shared pool of storage devices to the associated client device of the computer system is further adjusted based on a priority ranking for the associated client device in the listing of priority rankings.

7. The method of claim 1 further comprising:
analyzing the computer system to create a current network policy for the associated client device of the computer system.

8. The method of claim 1 wherein adjusting the IO throughput from the shared pool of storage devices to the associated client device of the computer system is further based at least on an indication of a time for adjustment of the IO throughput from the shared pool of storage devices to the associated client device.

9. The method of claim 8 wherein the indication of the time for adjustment of the IO throughput from the shared pool of storage devices is one of a time of day, a day of a week, or a day of a year.

10. The method of claim 1 wherein the IO throughput controller is an application program interface (API) executed on a server device associated with the computer system.

11. A computer system comprising:
an associated client device in communication with at least one physical component of the computer system, the associated client device comprising a computing device configured to execute one or more applications on the at least one physical component of the computer system;
a shared pool of storage devices in communication with the associated client device, the pool of storage devices available to a plurality of client devices of the computer system; and
an input/output (IO) throughput controller in communication with the associated client device and the pool of storage devices, the IO throughput controller configured to control an IO throughput from the pool of storage devices to the associated client device through operations of:
determining, based on monitoring a capacity of input/output (IO) throughput of the plurality of client devices of the computer system, to adjust the IO throughput of the associated client device, wherein the associated client device shares access to the shared pool of storage devices with the plurality of client devices of the computer system;
determining an adjusted IO throughput network policy for the associated client device based on the determination to adjust the IO throughput, wherein the adjusted IO throughput network policy modifies control, in accordance with the monitoring, of IO throughput over a network bandwidth of the associated client device that shares access with the plurality of client devices to the shared pool of storage devices;
translating the adjusted IO throughput network policy for the associated client device into an input for an IO throughput controller; and
adjusting, by the IO throughput controller, the IO throughput from the shared pool of storage devices to the associated client device based at least on the adjusted IO throughput network policy.

12. The computer system of claim 11, wherein the adjusted IO throughput network policy is automatically adjusted in response to a behavior of the associated client device of the computer system, and wherein the computer system is a converged infrastructure.

13. The computer system of claim 11, wherein the determination to adjust the IO throughput is based on a historical IO throughput usage of the associated client device of the computer system.

14. The computer system of claim 11, the IO throughput controller configured to further control the IO throughput through the operations of:
predicting IO throughput based on a historical IO throughput usage of the associated client device; and
pre-allocating IO throughput in accordance with the prediction to determine the adjusted IO throughput network policy.

15. The computer system of claim 11, the IO throughput controller configured to further control the IO throughput through the operations of:
accessing a policy database to obtain a historical IO throughput usage information file for the associated client device of the computer system; and
wherein the adjusted IO throughput from the shared pool of storage devices to the associated client device of the computer system is further adjusted based on the historical IO throughput usage information file for the associated client device.

16. A network device comprising:
a communication service in communication with an associated client device and a shared pool of storage devices available to the associated client device, the associated client device in communication with at least one physical component of a computer system comprising a plurality of client devices configured to execute one or more applications on the at least one physical component of the computer system; and
a controller service for executing instructions stored in a computer-readable storage medium, wherein execution of the instructions by a processor:
determines, based on monitoring a capacity of input/output (IO) throughput of the plurality of client devices of the computer system, to adjust the IO throughput of the associated client device, wherein the associated client device shares access to the shared pool of storage devices with the plurality of client devices of the computer system;
determines an adjusted IO throughput network policy for the associated client device based on the determination to adjust the IO throughput, wherein the adjusted IO throughput network policy modifies control, in accordance with the monitoring, of IO throughput over a network bandwidth of the associated client device that shares access with the plurality of client devices to the shared pool of storage devices;
translates the adjusted IO throughput network policy for the associated client device into an input for an IO throughput controller; and
adjusts the IO throughput from the shared pool of storage devices to the associated client device based at least on the adjusted IO throughput network policy.

17. The network device of claim 16, wherein the adjusted IO throughput network policy is automatically adjusted in response to a behavior of the associated client device of the computer system, and wherein the computer system is a converged infrastructure.

18. The network device of claim 16, wherein the determination to adjust the IO throughput is based on a historical IO throughput usage of the associated client device of the computer system.

19. The network device of claim 16, wherein the execution of the instructions by the processor further:
   predicts IO throughput based on a historical IO throughput usage of the associated client device; and
   pre-allocates IO throughput in accordance with the prediction to determine the adjusted IO throughput network policy.

20. The network device of claim 16, wherein the execution of the instructions by the processor further:
   accesses a policy database to obtain a historical IO throughput usage information file for the associated client device of the computer system; and
   wherein the adjusted IO throughput from the shared pool of storage devices to the associated client device of the computer system is further adjusted based on the historical IO throughput usage information file for the associated client device.

\* \* \* \* \*